US006185293B1

United States Patent
Je

(10) Patent No.: US 6,185,293 B1
(45) Date of Patent: Feb. 6, 2001

(54) SIGNAL MATCHING APPARATUS FOR EXCHANGING SIGNALS BETWEEN AN ANALOG SWITCHING SYSTEM AND A DIGITAL SWITCHING SYSTEM

(75) Inventor: Hyun-Soo Je, Kumi (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/039,626

(22) Filed: Mar. 16, 1998

(30) Foreign Application Priority Data

Mar. 14, 1997 (KR) .................................................... 97-8613

(51) Int. Cl.$^7$ .................................................... H04M 1/00
(52) U.S. Cl. ............................................. 379/339; 379/345
(58) Field of Search ............................... 379/339, 344, 379/345, 402, 399; 341/126; 370/282

(56) References Cited

U.S. PATENT DOCUMENTS

| 3,973,088 | * | 8/1976 | Ota et al. ............................. | 379/405 |
|---|---|---|---|---|
| 4,309,766 | | 1/1982 | Lechner et al. . | |
| 4,331,843 | * | 5/1982 | Tarr et al. ............................. | 379/403 |
| 4,387,277 | * | 6/1983 | Gilles et al. .......................... | 379/345 |
| 4,489,222 | * | 12/1984 | Lusignan et al. .................... | 379/402 |
| 4,535,444 | | 8/1985 | Falzone et al. . | |
| 4,554,416 | * | 11/1985 | Pacini et al. ......................... | 379/345 |
| 4,712,233 | * | 12/1987 | Kuo ...................................... | 379/399 |
| 4,757,497 | | 7/1988 | Beierle et al. . | |
| 4,796,296 | | 1/1989 | Amada et al. . | |
| 4,947,483 | * | 8/1990 | Dirr ...................................... | 370/282 |
| 5,034,978 | * | 7/1991 | Nguyen et al. ...................... | 379/345 |
| 5,175,763 | * | 12/1992 | Gazsi .................................... | 379/402 |
| 5,325,422 | | 6/1994 | Ladd . | |
| 5,657,358 | | 8/1997 | Panech et al. . | |
| 5,687,194 | | 11/1997 | Paneth et al. . | |
| 5,691,718 | * | 11/1997 | Balatoni et al. ..................... | 341/126 |

OTHER PUBLICATIONS

Gorokhov V.A., Polkovsky I.M., Stytsko V.P. Kompleksnaya Miniatjurizatsia v. Elektrosvyazi (*Complex Miniaturization in Telecommunications*), Moscow, Radio and Communications Publishers, 1987, p 226.

* cited by examiner

Primary Examiner—David R. Hudspeth
Assistant Examiner—Martin Lerner
(74) Attorney, Agent, or Firm—Robert E. Bushnell, Esq.

(57) ABSTRACT

A signal matching apparatus for exchanging signals between a digital switching system and a two-wire long distance subscriber line signal switching system comprises a first PCM equipment for converting a 4-wire E1 signal of the digital switching system into a 4-wire analog signal, and for connecting a 4-wire analog signal of the long distance subscriber line signal switching system into a 4-wire digital signal transferred to the digital switching system, and a second PCM equipment for converting the 4-wire analog signal of the first PCM equipment into a 2-wire signal, and for converting the analog signal of the long distance subscriber line signal switching system into a 4-wire analog signal transferred to the first PCM equipment.

12 Claims, 6 Drawing Sheets

SIGNAL MATCHING APPARATUS FOR EXCHANGING SIGNALS BETWEEN AN ANALOG SWITCHING SYSTEM AND A DIGITAL SWITCHING SYSTEM

CLAIM OF PRIORITY

This application makes reference to, incorporates the same herein, and claims all benefits accruing under 35 U.S.C. §119 from an application for SIGNAL MATCHING APPARATUS FOR EXCHANGING SIGNALS BETWEEN AN ANALOG SWiTCHING SYSTEM AND A DIGITAL SWITCHING SYSTEM earlier filed in the Korean Industrial Property Office on Mar. 14 1997 and there duly assigned Ser. No. 8613/1997.

BACKGROUND OF THE INVENTION

1. Technical Field

The present invention concerns an apparatus for matching an analog switching system with a digital switching system to exchange signals between them.

2. Related Art

Generally, the analog switching system is a manual switching system installed in a rural network area which is not provided with means for utilizing the main network installed in an urban area. The analog switching system employs the long distance subscriber line signal handled by the rural network, and provides the long distance subscribers with calling service by making a connection with a central exchange which is installed in the urban area typically located over a few hundred kilometers from the analog switching system.

Typically, such analog switching systems require an analog-to-digital (A/D) converter, such as a PCM30-4 (A/D converter) in order to achieve a system which is harmonious with a digital switching system. However, since such systems are typically designed according to the signaling system known as R1, R2/CAS, such a system may not be employed in a rural network system as generally described above, and as described in more detail below. Therefore, there has been a requirement for a signal conversion system to process a 2-wire long-distance subscriber line signal so as to match the digital switching system with the analog switching system typically employed in a rural network system.

Thus, there is a need in the art to provide a signal matching system which matches a digital switching system with an analog switching system using a 2-wire long-distance subscriber line signal.

The following patents are considered to be representative of the prior art, and are burdened by the disadvantages set forth herein: U.S. Pat. No. 4,535,444 to Falzone et al, entitled Digital Switching Exchange For Telephone Systems, U.S. Pat. No. 5,657,358 to Panech et al, entitled Subscriber RF Telephone System For Providing Multiple Speech And/Or Data Signals Simultaneously Over Either A Single Or Plurality OfRF Channels, U.S. Pat. No. 5,687,194 to Paneth et al., entitled Subscriber RF Telephone System For Providing Multiple Speech And/Or Data Signals Simultaneously Over Either A Single Or A Plurality Of RF Channels, U.S. Pat. No. 5,325,422 to Ladd, entitled PBX Telephone Call Control System, U.S. Pat. No. 4,796,296 to Amada et al, entitled PCM Coder And Decoder Having Function Of Two-Wire/Four-Wire Conversion, U.S. Pat. No. 4,757,497 to Bejerle et al., entitled Local Area Voice/Data Communications And Switching System, and U.S. Pat. No. 4,309,766 to Lechner et al., entitled ArrangementFor Subscriber Circuits UtilizingDigital Time Division Multiplex Telecommunication Installations And Particularly For PCM Local

SUMMARY OF THE INVENTION

It is an object of the present invention to provide a signal matching system which matches a digital switching system with an analog switching system using a 2-wire long distance subscriber line signal.

According to the present invention, a signal matching apparatus for exchanging signals between a digital switching system and a two-wire long distance subscriber line signal switching system comprises a first PCM equipment for converting the 4-wire E1 signal ofthe digital switching system into a 4-wire analog signal, and the 4-wire analog signal of the long distance subscriber line signal switching system into a 4-wire digital signal for transfer to the digital switching system, and a second PCM equipment for converting the 4-wire analog signal of the first PCM equipment into a 2-wire signal, and the analog signal of the long distance subscriber line signal switching system into a 4-wire analog signal for transfer to the first PCM equipment.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
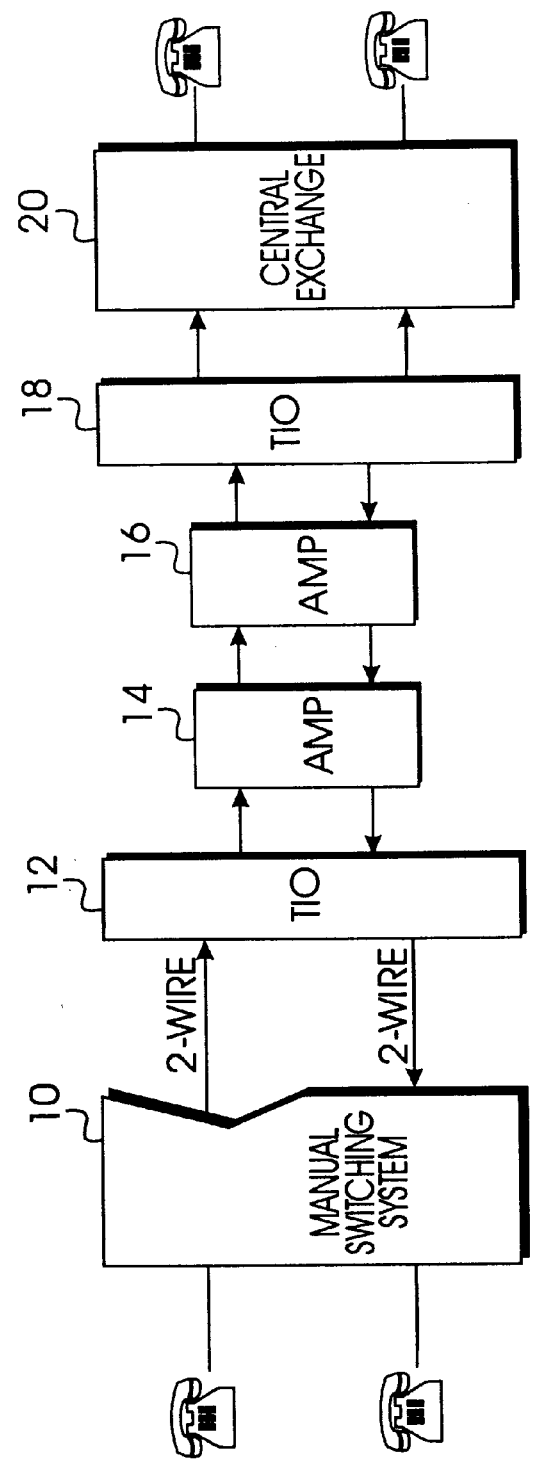
FIG. 1 is a block diagram illustrating the construction of an analog 2-wire long distance subscriber line network.

Referring to FIG. 1 illustrating the construction of the analog 2-wire long distance subscriber line network, the hook-off signal initiated by a subscriber of the analog switching system 10 is transmitted to the transmission input/output device (TIO) 12 of the manual switching station, which converts the hook-off signal into a seizure signal transferred through amplifiers 14, 16 to the input/output transmission device 18 of the analog switching station. The amplifiers 14, 16 serve to amplify the signals according to the distance to be traversed. The analog switching transmission input/output device 18 converts the seizure signal into the corresponding hook-off signal transferred to the central exchange 20, which transmits the dial tone through the occupied line to the analog switching transmission input/output device 18.

Then, the analog switching transmission input/output transmission device 18 converts the dial tone into a corresponding seizure acknowledgment signal (Seizure Ack) which is transferred through the amplifiers 14, 16 to the manual switching transmission input/output device 12, which in turn converts the seizure acknowledgment signal into a dial tone which is transferred to the calling subscriber of the manual switching system 10. Thereafter, the calling subscriber dials the desired number, and that digital data is delivered through the manual switching, transmission input/output device 12 and the analog switching transmission input/output device 18 to the central exchange (ATC), 20. The ATC 20 analyzes the digital data so as to connect the calling subscriber with the receiving subscriber. If the receiving subscriber is free, the ATC 20 transfers the ring-back tone to the analog switching transmission input/output device 18, which in turn converts the ring-back tone into the receiving subscriber's free-state signal which is transferred through the amplifiers 14, 16 to the manual switching transmission input/output device 12. Finally, the manual switching transmission input/output device 12 converts the receiving subscriber's free-state signal into a ring-back tone signal which is transferred to the calling subscriber, thus forming the communication path. This is a typical rural network switching system which is much used in the rural networks of Russia.

The analog switching system requires a PCM 30-4 A/D converter in order to achieve a system which cooperates with the digital switching system. However, since such system is designed according to the well-known signaling system R1, R2/CAS, it may not be employed in the rural network system shown in FIG. 1. Hence, there has been required a signaling conversion system to process the 2-wire long distance subscriber line signal so as to match the digital switching system with the analog switching system typically used in the rural network system.

Figure 2:
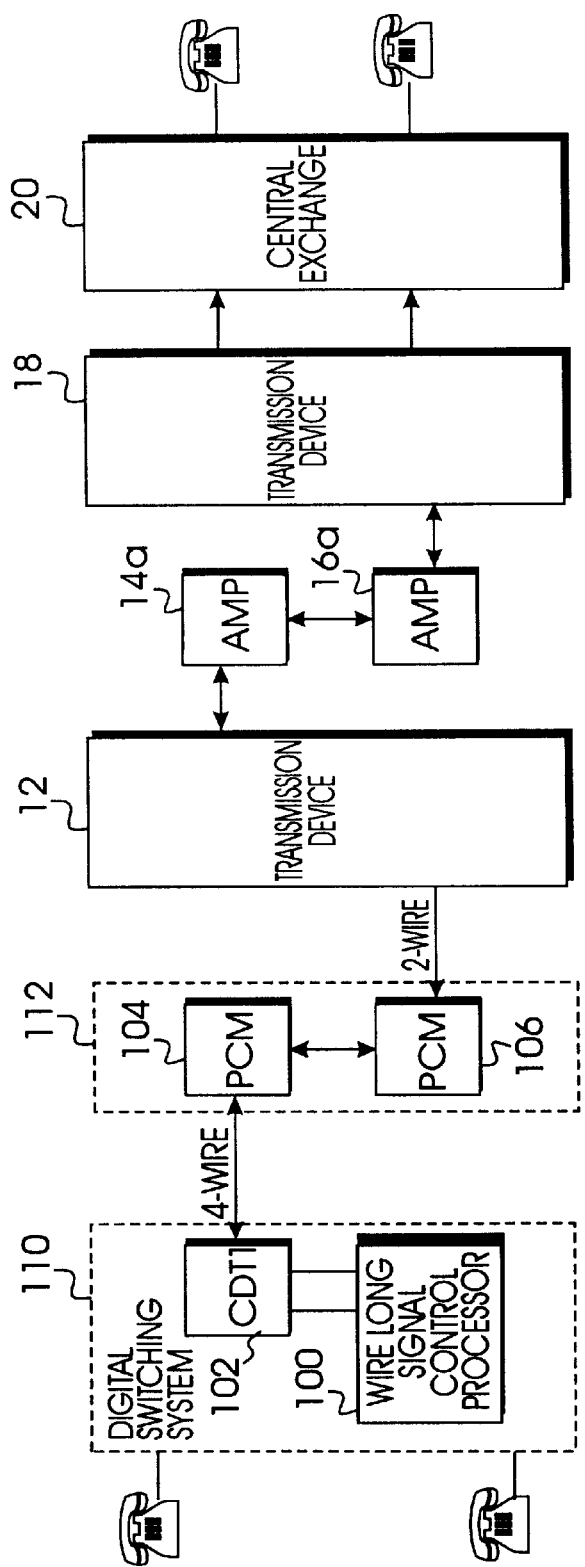
FIG. 2 is a block diagram illustrating the connection of the analog 2-wire-long-distance subscriber line switching system and the digital switching system according to the present invention.

Referring to FIG. 2, there is provided a long signal control processor 100, which converts the E1 signal of the digital switching system into a line/register signal required by the analog switching system so as to match with the 2-wire long distance subscriber line signal, and which analyzes the received line/register signal. CDTI102 converts the line register signal into a 4-wire E1 digital signal when the subscriber of the digital switching system 110 calls the 2-wire long distance subscriber line.

The first PCM equipment 104 in PCM stage 112 consists of a PCM-30-4 and converts the line/register 4-wire digital signal of the CDTI 102 into the 4-wire analog signal transferred to the 4-wire/2-wire converter 106, and the analog signal of the analog switching system into the digital signal transferred to the digital switching system 110. The second PCM equipment 106 converts the analog 4-wire signal into the 2-wire signal transferred to the manual switching station input/output transmission device 12, and the 2-wire signal of the manual switching station input/output transmission device 12 into the 4-wire signal transferred to the first PCM equipment 104. The manual switching station input/output transmission device 12 converts the hook-off signal into a seizure signal transferred through the amplifiers 14a and 16a to the analog switching station input/output transmission device 18, which in turn converts the seizure signal into the hook-off signal transferred to the central exchange 20. The exchange 20 transfers the dial tone to the corresponding occupied line and to the analog switching station input/output transmission device 18. In addition, the exchange 20 analyzes the dial digital signal to connect with the receiving subscriber.

Figure 3:
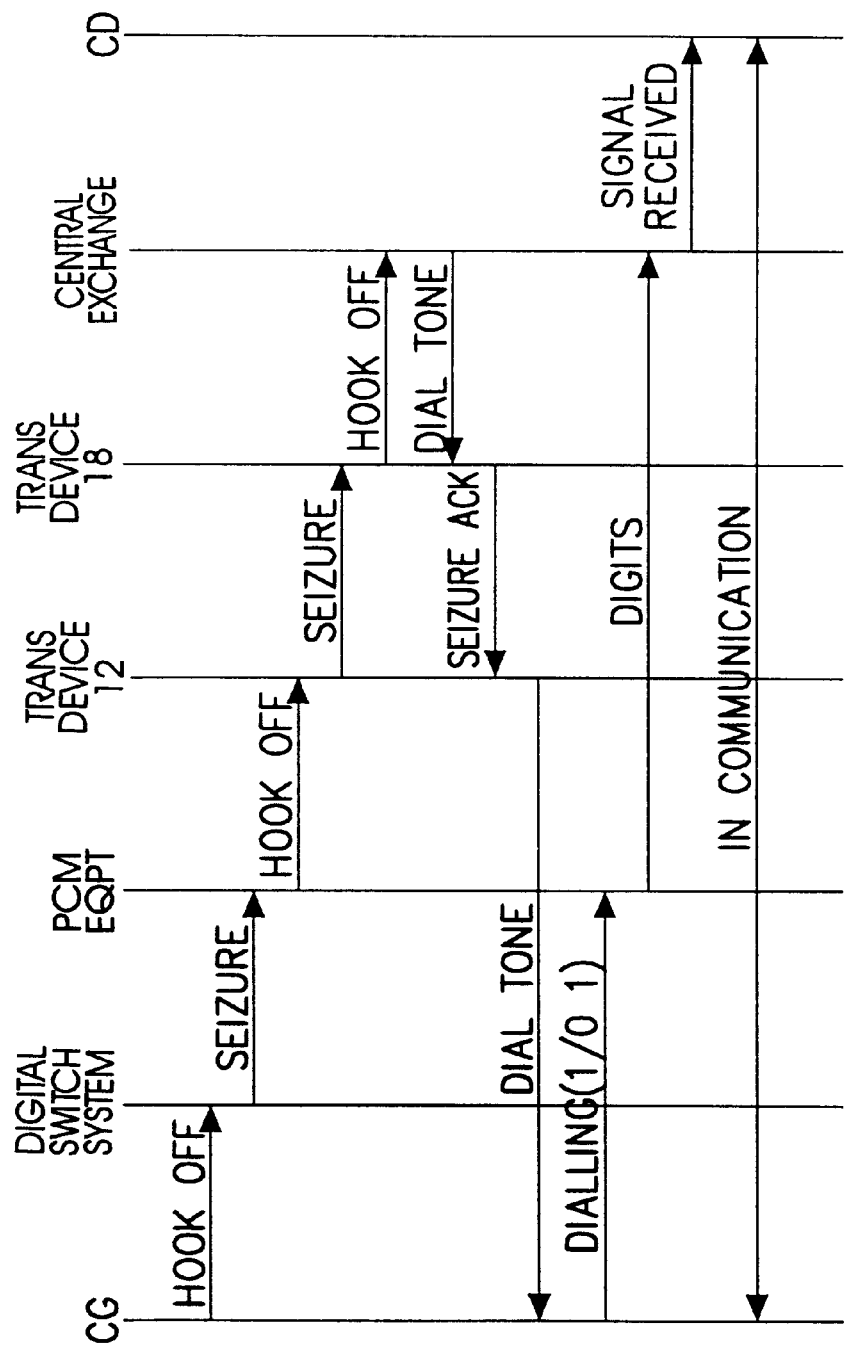
FIG. 3 is a diagram illustrating the steps of processing the signal when the digital switching system calls a subscriber of the analog switching system according to the present invention.
Figure 4:
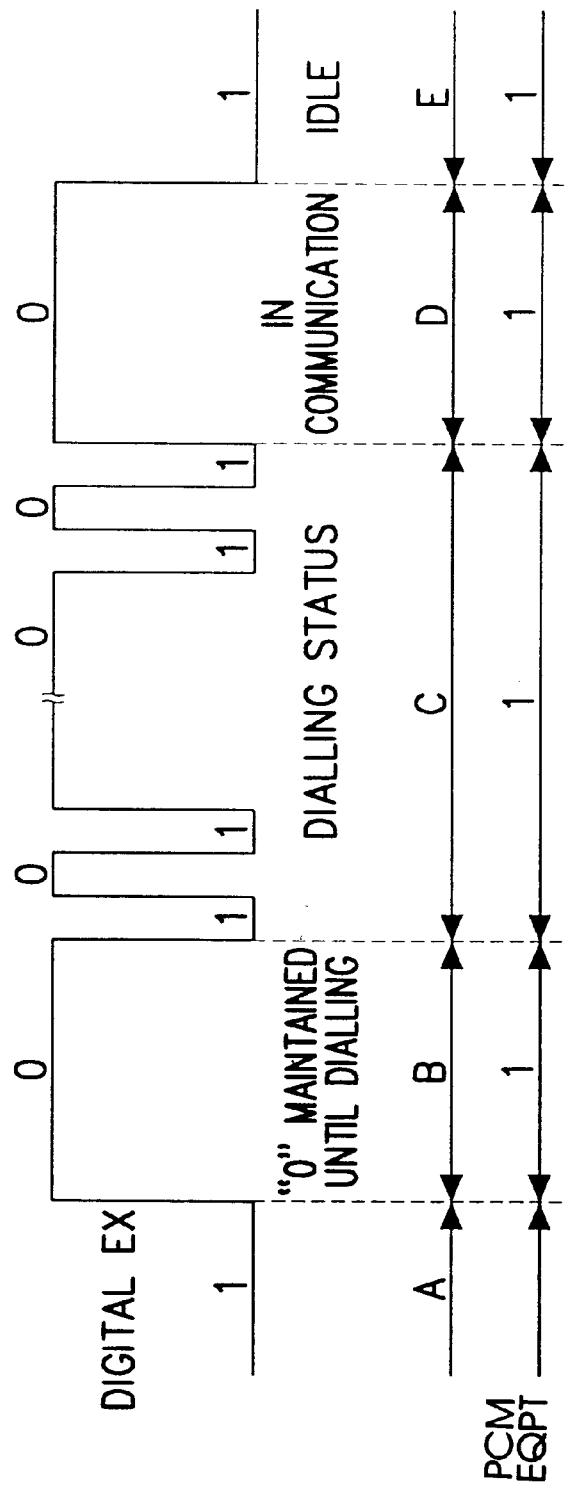
FIG. 4 is a graph illustrating the waveform of the signal transmitted from the digital switching system according to the present invention.

The matching operation is described specifically with reference to FIGS. 2 to 6 as follows:

Firstly, describing the case that the subscriber of the digital switching system 110 calls the subscriber of the long distance subscriber line signal switching system in reference to FIG. 3, the digital switching system 110 maintains a "0" signal as shown by interval B of FIG. 4, and converts the hook-off signal generated by the subscriber CG of the digital switching system 1 10 into a seizure signal applied to the first PCM equipment 104, which in turn converts the seizure signal into the digital signal transferred to the second PCM equipment 106. The second PCM equipment 106 converts the digital seizure signal into a 2-wire hook-off signal transferred to the manual switching station input/output transmission device 12, which in turn converts the hook-off signal into a seizure signal transferred through the amplifiers 14a and 16a to the analog switching station input/output transmission device 18. In this case, the amplifiers 14a and 16a amplify the signal according to the transmission distance.

The analog switching station input/output transmission device 18 converts the seizure signal into the hook-off signal transferred to the central exchange 20 installed in the urban area. The exchange 20 transmits the dial tone through the corresponding occupied line to the analog switching station input/output transmission device 18, which in turn converts the dial tone into the seizure acknowledgment signal Seizure Ack transferred through the amplifiers 14a and 16a to the manual switching station input/output transmission device 12.

The manual switching station input/output transmission device 12 converts the seizure acknowledgment signal into the dial tone transferred through the second PCM equipment 106 and the first PCM equipment 104 to the digital switching system 110, which in turn transfers the dial tone to the calling subscriber. Then, the call subscriber dials the desired number, from which the digital switching system 110 transfers the dial pulses as shown by interval C of FIG. 4 to the first and second PCM equipments 104 and 106, which transfer the dialed digital data through the manual switching station transmission input/output device 12 to the analog switching station input/output transmission device 18 to the ATC 20. The ATC 20 analyzes the digital signal to connect the calling subscriber CG with the receiving subscriber CD. In this case, the digital switching system 110 maintains "0" as shown by interval D of FIG. 4, recognizing the communication state. Finishing the communication, the digital switching system 110 maintains "1" as shown by interval E of FIG. 4, recognizing the idle state. Thus, when the subscriber of the digital switching system 110 calls the analog switching system, the digital switching system 110 always recognizes the states of the first and second PCM equipments 104 and 106 consisting of PCM-30-4 as "1".

Figure 5:
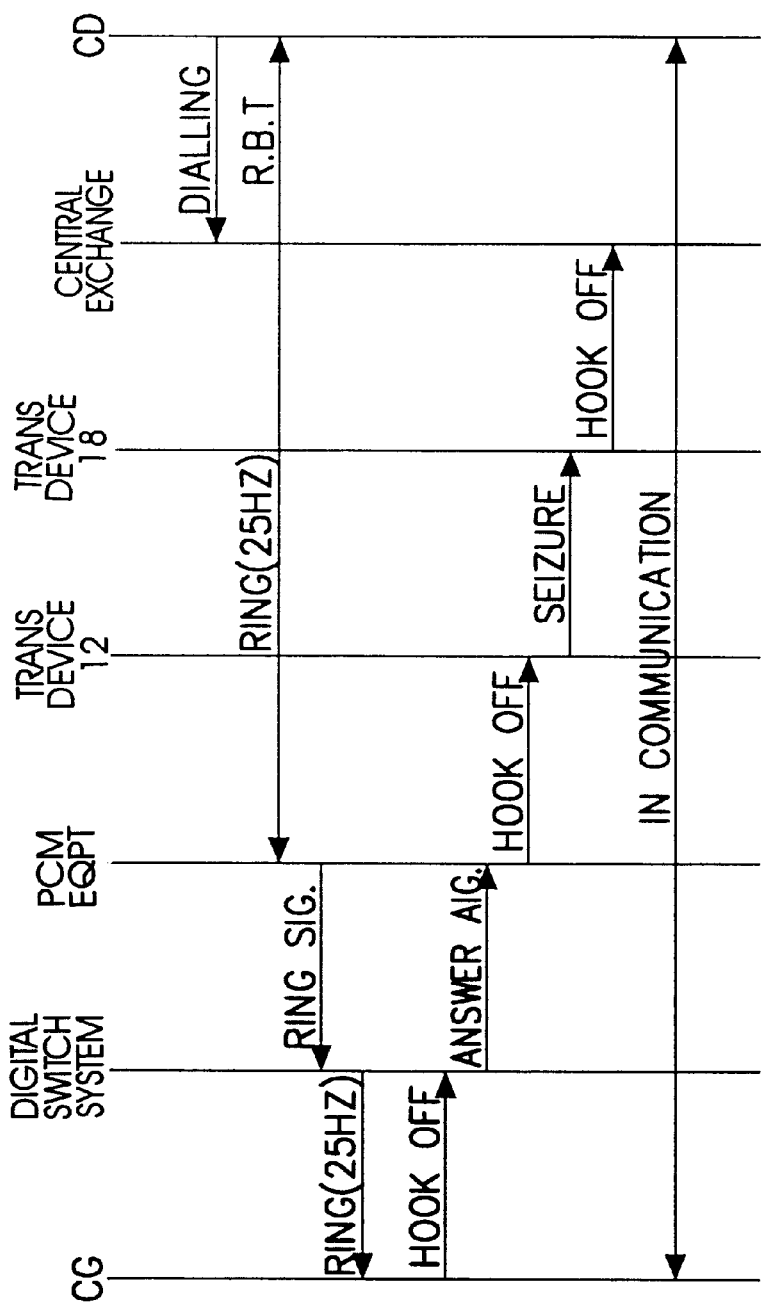
FIG. 5 is a diagram illustrating the steps of processing the signal when the analog switching system calls a subscriber of the digital switching system according to the present invention.

Secondly, referring to FIG. 5, describing the case that the subscriber of the long distance subscriber line signal switching system (exchange 20) calls the subscriber of the digital switching system 110, the exchange 20 transfers the dialed ring signal from the subscriber CD of the exchange 20 to the corresponding occupied line and the ring-back tone to the calling subscriber CD. The ring signal is transferred to the analog switching station input/output transmission device 18, which in turn delivers the ring signal through the amplifiers 14a and 16a to the manual switching station input/output transmission device 12.

Figure 6:
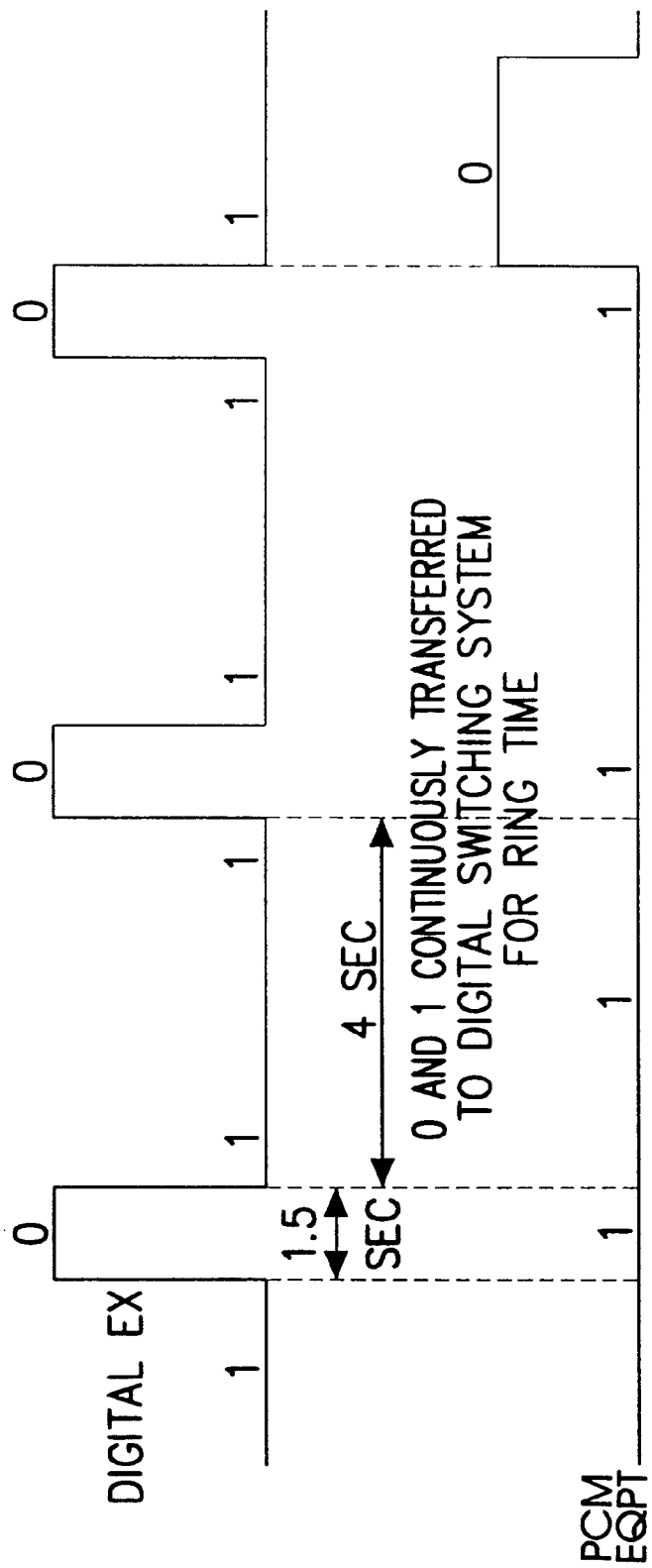
FIG. 6 is a graph illustrating the waveform ofthe signal transmitted from the analog switching system according to the present invention

The manual switching station input/output transmission device 12 applies the ring signal to the second PCM equipment 106. Then, the first and second PCM equipments 104 and 106, respectively, convert the ring signal into a digital ring signal whose value is "0" for 1.5 seconds and "1" for 4 seconds as shown in FIG. 6, and transfers it to the digital switching system 110, which in turn converts the digital ring signal into the ring signal sound of 25 Hz transferred to the receiving subscriber CG. In response to the ring signal sound, if the receiving subscriber CG picks up the transmitter/receiver off the hook, the digital switching system 110 transfers the answering signal (ANSWER AIG) to the first PCM equipment 104.

The first and second PCM equipments 104 and 106, respectively, convert the answering signal into the hook-off signal transferred to the manual switching station input/output transmission device 12, which in turn converts the hook-off signal into the seizure signal transferred through the amplifiers 14a and 16a to the analog switching station input/output transmission device 18. The analog switching station input/output transmission device 18 converts the seizure signal into a hook-off signal transferred to the central exchange 20, which in turn connects the calling subscriber CD with the receiving subscriber CG of the digital switching system 110. Receiving the hook-off signal, the digital switching system 110 maintains "0" state as shown in FIG. 6, and then takes on a "1" state after recognizing the connection of the communication line through the first PCM equipment 104.

Thus, the PCM-30-4 A/D converter is effectively employed to match the signal of the digital switching system with that of the 2-wire long distance subscriber line signal analog switching system, so that the cost of developing the signal converter, as well as additional equipment, can be avoided.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A signal matching apparatus for exchanging signals between a digital switching system and a two-wire long distance subscriber line signal switching system, comprising:

PCM equipment means for converting a 4-wire E1 signal input from said digital switching system into a 4-wire analog signal output, and for converting a 4-wire analog signal input into a 4-wire digital signal output which is transferred to said digital switching system; and converter means for converting the 4-wire analog signal output of said PCM equipment means into a 2-wire signal output, and for converting an analog signal input from said two-wire long distance subscriber line signal switching system into the 4-wire analog signal input which is transferred to said PCM equipment means;

said apparatus further comprising amplifier means connected between said converter means and said long distance subscriber line signal switching system for amplifying the 2-wire signal output of said converter means prior to provision to said long distance subscriber line signal switching system, and for amplifying the analog signal input from said long distance subscriber line signal switching system prior to provision to said converter means.

2. A signal matching apparatus as claimed in claim 1, wherein said PCM equipment means and said converter means are connected between said digital switching system and said two-wire long distance subscriber line signal switching system in order to enable signal exchange.

3. A signal matching apparatus as claimed in claim 1, further comprising:

transmission means connected between said converter means and said amplifier means for transmitting signals to and from said converter means; and further transmission means connected between said amplifier means and said two-wire long distance subscriber line signal switching system for transmitting signals between said amplifier means and said two-wire long distance subscriber line signal switching system.

4. A signal matching apparatus as claimed in claim 1, wherein said amplifier means comprises first and second amplifiers connected in series between said converter means and said two-wire long distance subscriber line signal switching system for amplifying both the 2-wire signal output of said converter means and the analog signal input from said two-wire long distance subscriber line signal switching system.

5. A signal matching apparatus as claimed in claim 1, wherein said PCM equipment means comprises a PCM-30-4 device.

6. An apparatus for exchanging signals between a digital switching system and a 2-wire long distance subscriber line signal switching system, comprising:

converter means connected to said digital switching system via a 4-wire transmission line for converting a 4-wire signal from said digital switching system into a 2-wire signal for transfer to said 2-wire long distance subscriber line signal switching system, and for converting a 2-wire signal received from said 2-wire long distance subscriber line signal switching system into a 4-wire digital signal for transfer to said digital switching system; and first and second amplifiers connected in series between said converter means and said 2-wire long distance subscriber line signal switching system for amplifying said 2-wire signal received from said 2-wire long distance subscriber line signal switching system prior to provision to said converter means.

7. The apparatus of claim 6, wherein said converter means comprises:

PCM equipment for converting the 4-wire signal from said digital switching system into a 4-wire analog signal, and for converting a received 4-wire analog signal into a 4-wire digital signal for transfer to said digital switching system; and a converter for converting the 4-wire analog signal from said PCM equipment into the 2-wire signal for transfer to said 2-wire long distance subscriber line signal switching system, and for converting the 2-wire signal received from said long distance subscriber line signal switching system into the received 4-wire analog signal converted by said PCM equipment.

8. The apparatus of claim 7, wherein said PCM equipment and said converter are connected between said digital switching system and said 2-wire long distance subscriber line signal switching system in order to enable signal exchange.

9. The apparatus of claim 7, wherein said PCM equipmentcomprises a PCM-30-4 device.

10. The apparatus of claim 6, further comprising transmission means connected between said converter means and said first amplifier for transmitting signals therebetween.

11. The apparatus of claim 10, further comprising additional transmission means connected between said second amplifier and said 2-line long distance subscriber line signal switching system for transmitting signals therebetween.

12. The apparatus of claim 6, further comprising additional transmission means connected between said second amplifier and said 2-line long distance subscriber line signal switching system for transmitting signals therebetween.

* * * * *